May 4, 1954
R. P. OWEN
2,677,785
SCANNING CIRCUIT FOR CATHODE RAY TUBES
Filed Jan. 24, 1951
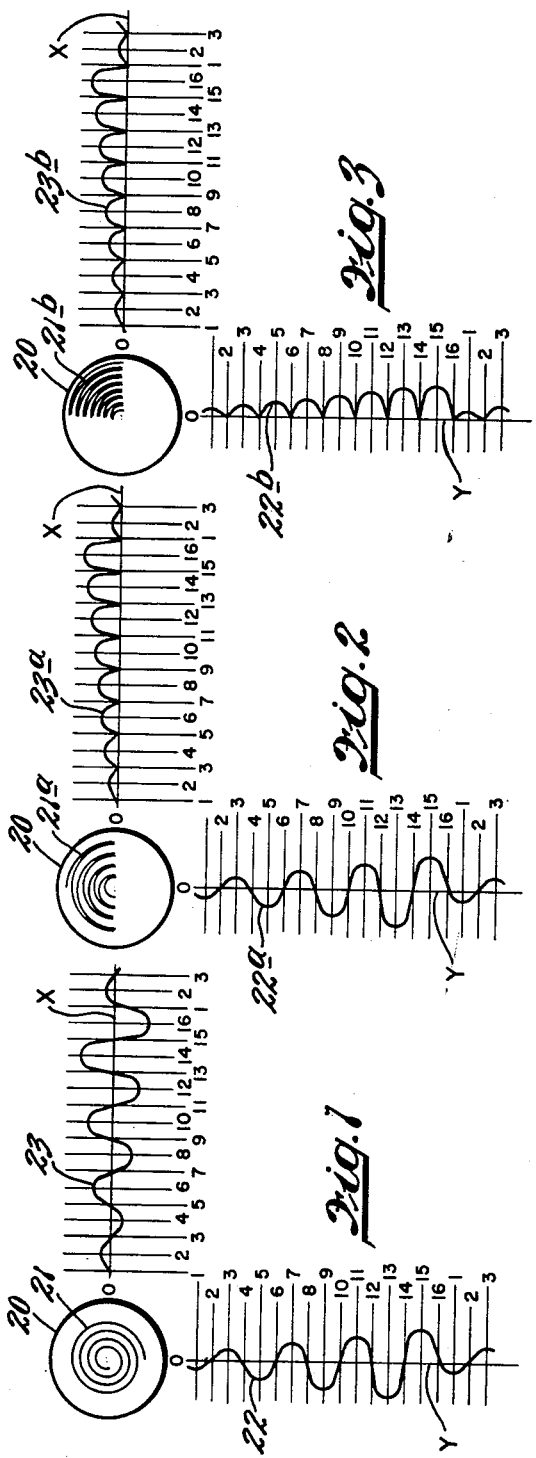
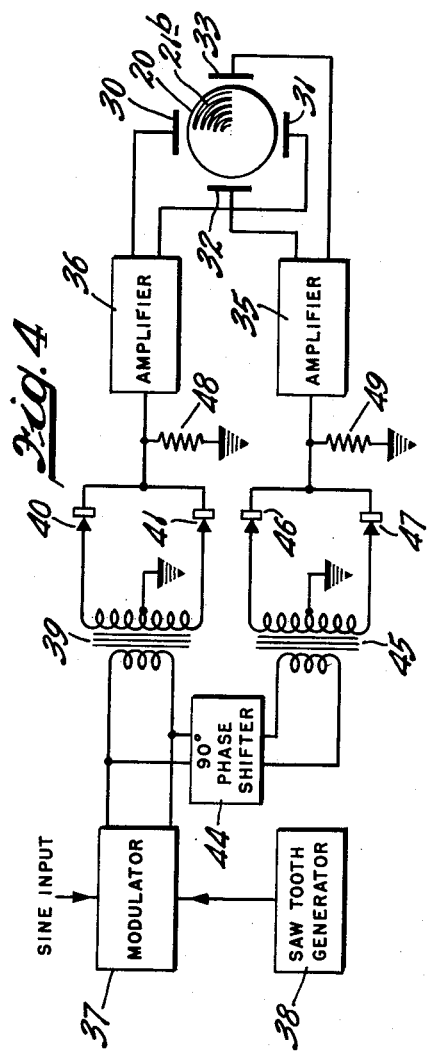
INVENTOR.
Robert P. Owen
BY
ATTORNEY Patented May 4, 1954

2,677,785

UNITED STATES PATENT OFFICE 2,677,785

SCANNING CIRCUIT FOR CATHODE-RAY TUBES

Robert P. Owen, San Fernando, Calif., assignor to Bendix Aviation Corporation, South Bend, Ind., a corporation of Delaware Application January 24, 1951, Serial No. 207,613

8 Claims. (Cl. 315—24)

This invention relates to scanning circuits for energizing the beam deflecting elements of a cathode ray tube to cause the beam to periodically scan a predetermined pattern on the face of the tube.

An object of the invention is to scan only a sector of the face of a cathode ray tube.

Another object is to scan a sector only of the face with a back and forth sweep as distinct from a continuous rotary sweep in one direction.

Other more specific objects and features of the invention will appear from the description to follow:

It is well known that with a conventional cathode ray tube having two beam deflection systems disposed at right angles to each other, a circular sweep or scan can be produced by applying two sinusoidal waves to the respective beam deflection systems and dephasing the two waves 90 degrees with respect to each other. It is also well known that by modulating the sinusoidal waves with a lower frequency saw tooth wave so that their amplitude progressively increases from zero to a maximum value, and then repeats or vice versa, the tube can be caused to scan with a spiral sweep that starts at the center of the face of the tube and works to the outer edge, or, vice versa, starts at the outer edge and works into the center. Such arrangements are commonly used in radar and sonar.

In some systems, particularly in the field of radar and sonar, it is desirable to scan only a sector of the face of the tube instead of the full area thereof, and to cause the scanning spot to sweep back and forth through the sector instead of moving always in the same direction. In accordance with the present invention I have found that a back and forth scan through half the face of the tube, representing a sector of 180 degrees, or through a quarter of the face of the tube, representing a quadrant, can be obtained by full wave rectification of one or both of the sinusoidal scanning waves. If only one of the waves is rectified, the result is a back and forth scan through a sector of 180 degrees. If both of the sinusoidal waves are rectified the result is a back and forth scan through only a quadrant of the tube. The circuit is particularly desirable because of its extreme simplicity.

A full understanding of the invention may be had from the following detailed description when read in connection with the drawing, in which:

Fig. 1 is a schematic diagram illustrating the operation of the conventional full face, spiral scan;

Fig. 2 is a similar diagram illustrating the application of the present invention to produce a back and forth scan through a semi-circular field;

Fig. 3 is a similar diagram illustrating the application of the present invention to produce a back and forth scan through one quadrant of the tube face; and Fig. 4 is a schematic diagram of a circuit that can be employed to produce the result illustrated in Fig. 3.

Referring to Fig. 1, there is shown in elevation the face of a cathode ray tube 20, the cathode spot of which is moved through a spiral scanning path 21 by the application, to the horizontal and vertical deflection systems of the tube, sinusoidal waves of the same frequency but of gradually increasing amplitude and displaced in phase 90 degrees with respect to each other. The wave applied to the horizontal deflection system is shown at 22 with its axis Y vertical and intersecting the center of the tube face. The vertical deflection system of the tube is energized by the wave 23 which is shown with its axis X horizontal and intersecting the center of the tube face. The deflection of the beam spot vertically is proportional at any instant to the spacing of the wave 23 from the horizontal axis X, and the horizontal deflection of the spot at any instant is proportional to the displacement of the wave 22 from its associated vertical axis Y. Corresponding times are indicated progressively from left to right along the axis X, and from top to bottom along the axis Y. Thus it will be observed that at the starting time 1 the wave 23 is at zero whereas wave 22 is at maximum amplitude. By projecting points on both waves at corresponding times back to the face of the tube, the location of the cathode spot can be determined, and it will be readily observable that the locus of the spot will be a spiral line as indicated at 21.

Referring now to Fig. 2, the conditions are identical with those in Fig. 1 except that the wave 23a, applied to the vertical deflection system of the tube, has been full-wave rectified. Each half wave of this wave therefore has the same amplitude characteristics as the corresponding half wave of the wave 23 in Fig. 1, but all half waves are positive and rise above the axis X. The result is that whereas the horizontal component of the beam movement is unchanged, the vertical movement is confined to the upper half of the tube face. The result is that instead of the beam following a spiral path, it follows a back and forth arcuate path confined to the upper half of the tube face, as illustrated at 21a. That this result is achieved can be readily verified by projecting points on the waves 22a and 23a at corresponding instants back to the tube face.

Referring to Fig. 3, both of the waves have been full wave rectified, so that the beam spot scans back and forth in an arcuate path confined to a 90° sector, or a quadrant, of the tube face.

In each of Figs. 1, 2 and 3 there is shown a train of scanning waves of increasing amplitude so that each arcuate sweep of the beam spot is radially displaced from the preceding sweep. In most applications an area sweep of this type is preferred. However, it is to be understood that the invention is not limited to an area sweep, and can be employed to produce a back and forth sweep of the beam through a single arc by making both of the waves 22a and 23a and 22b and 23b of constant amplitude at all times.

It is to be understood that the cathode beam may not be in existence at all times, and in fact in practice it is usually not. Thus in radar applications it is the practice to suppress the beam except in response to received signals indicating a reflection from an obstacle or the like, the location of the beam only at the instant of reception being indicated on the face of the tube.

The essentials of a scanning circuit in accordance with the invention are shown in Fig. 4. In Fig. 4, the cathode ray tube 20 is shown as having a vertical deflection system, comprising two vertical deflection plates 30 and 31, and a horizontal deflection system comprising two horizontal deflection plates 32 and 33. The horizontal deflection system of the tube represented by the plates 32 and 33 is connected to the output of an amplifier 35, and the vertical deflection system, represented by the plates 30 and 31 is connected to the output of an amplifier 36. The inputs of these amplifiers 35 and 36 are supplied with suitable currents which may be derived as follows. An initial sine wave derived from any desired source is applied to a modulator 37 to which the output from a saw tooth generator 38 is also applied. This produces in the output of the modulator 37 a sinusoidal wave of recurrently varying amplitude, as shown by the wave 22 or the wave 23 in Fig. 1, or the wave 22a in Fig. 2. This wave is applied directly to the primary winding of a transformer 39. The midtap of the secondary winding of transformer 39 is shown connected to ground, and the opposite ends of the winding are connected through two half wave rectifiers 40 and 41 respectively to the input of the amplifier 36.

A portion of the output of the modulator 37 is delivered through a 90° phase shifter 44 to the primary winding of a second transformer 45, the secondary winding of which has its midpoint connected to ground, and its opposite ends connected through two half wave rectifying elements 46 and 47 respectively to the input of the amplifier 35. The usual load resistors 48 and 49 are shown shunted across the inputs of the amplifiers 36 and 35.

The complete circuit as shown in Fig. 4 is adapted to produce a quadrant scan as described in connection with Fig. 3, and to this end both of the sinusoidal scanning waves are full-wave rectified.

If it is desired to produce a sector scan through 180°, as shown in Fig. 2, then one of the waves from one of the transformers 39 or 45 is applied directly to its associated amplifier 36 or 35 without any rectification. Of course, if neither of the waves is rectified then the usual spiral scan, as shown in Fig. 1, is produced.

It will be apparent that the invention is applicable either to cathode ray tubes having plates for electro-statically deflecting the beam, as shown in Fig. 4, or to tubes having coils for magnetically deflecting the beam, and is not limited to tubes employing electrostatic deflection.

Although for the purpose of explaining the invention, a particular embodiment thereof has been shown and described, obvious modifications will occur to a person skilled in the art, and I do not desire to be limited to the exact details shown and described.

I claim:

1. The method of scanning the beam of a cathode ray tube having two beam deflecting systems, each producing beam deflection in direction perpendicular to that of the other, said method comprising: developing two sinusoidal waves of constant amplitude relative to each other and of the same frequency dephased 90° with respect to each other; energizing one deflecting system with one of said waves, and energizing the other deflecting system with the other wave; and rectifying one at least of said waves prior to applying it to its associated deflecting system, said rectified wave being unfiltered whereby its form is preserved.

2. The method of scanning the beam of a cathode ray tube having two beam deflecting systems each producing beam deflection in direction perpendicular to that of the other, said method comprising: developing two sinusoidal waves of constant amplitude relative to each other and of the same frequency and dephased 90° with respect to each other; energizing one of said deflecting systems with one of said waves, and energizing the other deflecting system with the other of said waves; and rectifying both of said waves prior to applying them to their associated deflecting systems, said rectified wave being unfiltered whereby its form is preserved.

3. The method of claim 1 including the step of modulating both of said waves to saw tooth envelope form.

4. The method of claim 2 including the step of modulating both of said waves to saw tooth envelope form.

5. The method of scanning the beam of a cathode ray tube having two beam deflection systems, each producing beam deflection in direction perpendicular to the other, said method comprising: applying to said respective beam deflection systems separate wave trains of the same half wave repetition rate and same relative amplitude and dephased 90° with respect to each other, both of said wave trains varying sinusoidally during each half wave period, and at least one of said wave trains consisting of successive half waves of the same polarity.

6. The method of claim 5 including the step of modulating both of said waves to a saw tooth envelope form.

7. A sector scan oscilloscope comprising: a cathode ray tube with two beam deflecting systems each producing beam deflection in direction perpendicular to the other; means for generating two sinusoidal wave trains of the same frequency and relative amplitude, dephased 90° with respect to each other; means for applying one of said wave trains to one of said beam deflecting systems; and means for applying the other of said wave trains to the other of said deflecting systems; at least one of said applying means including a rectifier for converting the sinusoidal wave train applied thereto into a train of sinusoidal half waves of single polarity.

8. A sector scan oscilloscope according to claim 7 including modulating means for modulating said two sinusoidal wave trains to a saw tooth envelope.

References Cited in the file of this patent

UNITED STATES PATENTS

| Number | Name | Date |
|---|---|---|
| 2,403,967 | Busignies | July 16, 1946 |
| 2,419,550 | Hardy | Apr. 29, 1947 |
| 2,421,747 | Engelhardt | June 10, 1947 |
| 2,426,208 | Hardy | Aug. 26, 1947 |
| 2,471,516 | Bryant | May 31, 1949 |